United States Patent
Shirahige et al.

(10) Patent No.: US 8,621,309 B2
(45) Date of Patent: Dec. 31, 2013

(54) PROCESSOR AND METHOD OF CONTROL OF PROCESSOR

(75) Inventors: Yuji Shirahige, Kawasaki (JP); Ryuichi Sunayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 518 days.

(21) Appl. No.: 12/946,278

(22) Filed: Nov. 15, 2010

(65) Prior Publication Data

US 2011/0119535 A1 May 19, 2011

(30) Foreign Application Priority Data

Nov. 16, 2009 (JP) ................................. 2009-260950

(51) Int. Cl.
*G08C 25/02* (2006.01)

(52) U.S. Cl.
USPC ............................. 714/748; 714/750; 714/751

(58) Field of Classification Search
USPC ..................... 714/17, 748, 750, 751
See application file for complete search history.

(56) References Cited

U.S. PATENT DOCUMENTS

| | | | |
|---|---|---|---|
| 4,901,228 A | 2/1990 | Kodama | |
| 6,332,181 B1 * | 12/2001 | Bossen et al. | 711/155 |
| 6,560,679 B2 | 5/2003 | Choi et al. | |
| 6,802,039 B1 * | 10/2004 | Quach et al. | 714/763 |
| 7,328,391 B2 | 2/2008 | Hart et al. | |
| 7,353,445 B1 * | 4/2008 | Barreh et al. | 714/758 |
| 7,975,172 B2 * | 7/2011 | Hickey et al. | 714/10 |
| 2004/0098540 A1 | 5/2004 | Itoh et al. | |
| 2008/0065873 A1 * | 3/2008 | Hall et al. | 712/245 |
| 2008/0301374 A1 * | 12/2008 | Hall et al. | 711/135 |

FOREIGN PATENT DOCUMENTS

| | | |
|---|---|---|
| JP | 02-041537 | 2/1990 |
| JP | 06-119245 | 4/1994 |
| JP | 2002-007210 | 1/2002 |
| JP | 2004-171177 A | 6/2004 |
| JP | 2005-182749 | 7/2005 |

OTHER PUBLICATIONS

"Extended European Search Report," mailed by EPO and corresponding to European application No. 10191077.6 on Apr. 19, 2011, 6 pages.
Japanese Office Action mailed Sep. 10, 2013 for corresponding Japanese Application No. 2009-260950, with partial English-language translation.

* cited by examiner

*Primary Examiner* — Joshua Lohn
(74) *Attorney, Agent, or Firm* — Fujitsu Patent Center

(57) ABSTRACT

A processor including: a first storage unit that stores data; an error detection unit that detects an occurrence of error in data read out from the first storage unit; a second storage unit that stores data read out from the first storage unit based on a load request; a rerun request generation unit that generates a rerun request of a load request to the first storage unit in the same cycle as the cycle in which error of data is detected when the error detection unit detects the occurrence of error in data read out from the first storage unit by the load request; and an instruction execution unit that retransmits the load request to the first storage unit when data in which error is detected and a rerun request are given.

4 Claims, 19 Drawing Sheets

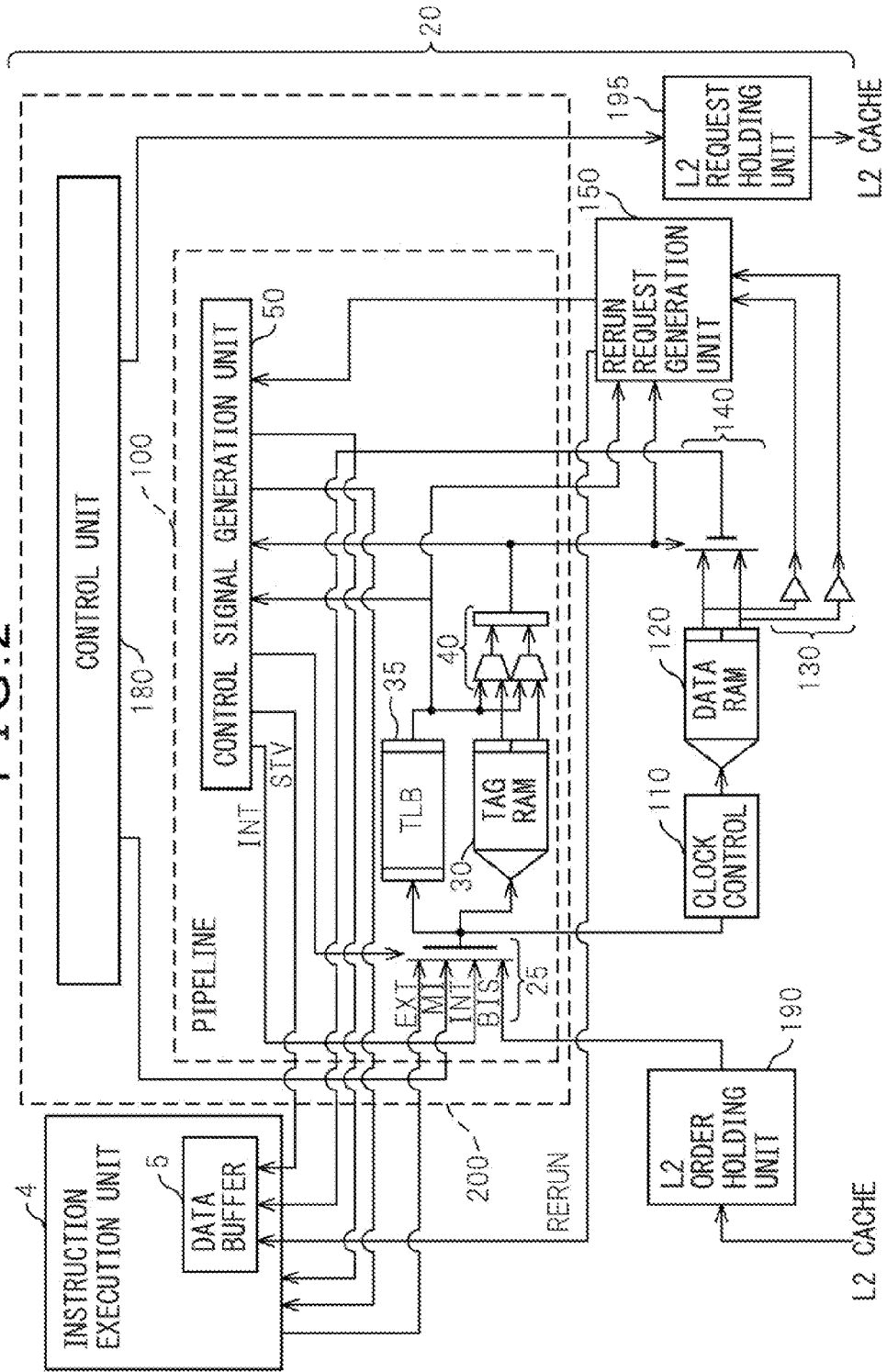

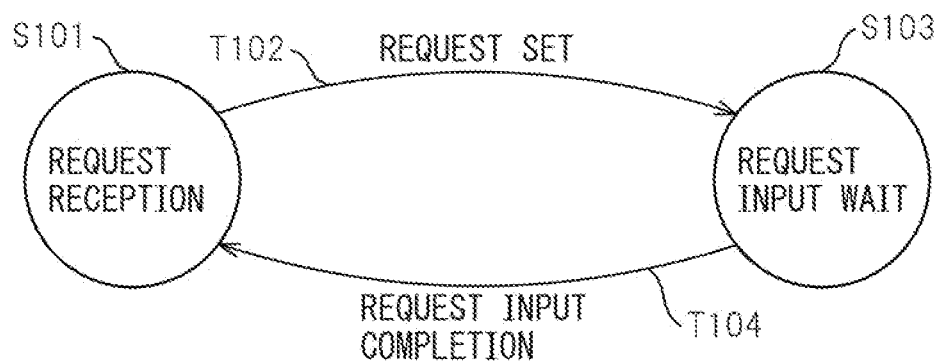

| | TW | MW | BW | RW | SELECTION | |
|---|---|---|---|---|---|---|
| 1200 | * | * | * | 1 | RW | L1201 |
| | * | * | 1 | 0 | BW | L1202 |
| | * | 1 | 0 | 0 | MW | L1203 |
| | 1 | 0 | 0 | 0 | TW | L1204 |

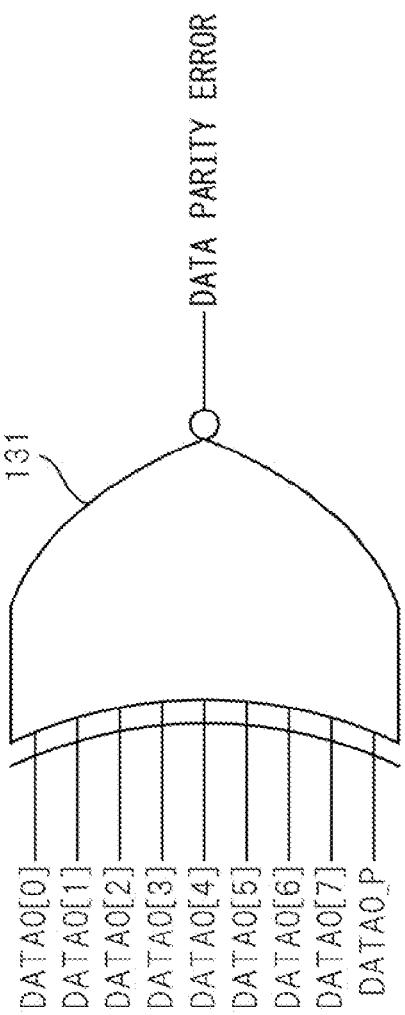
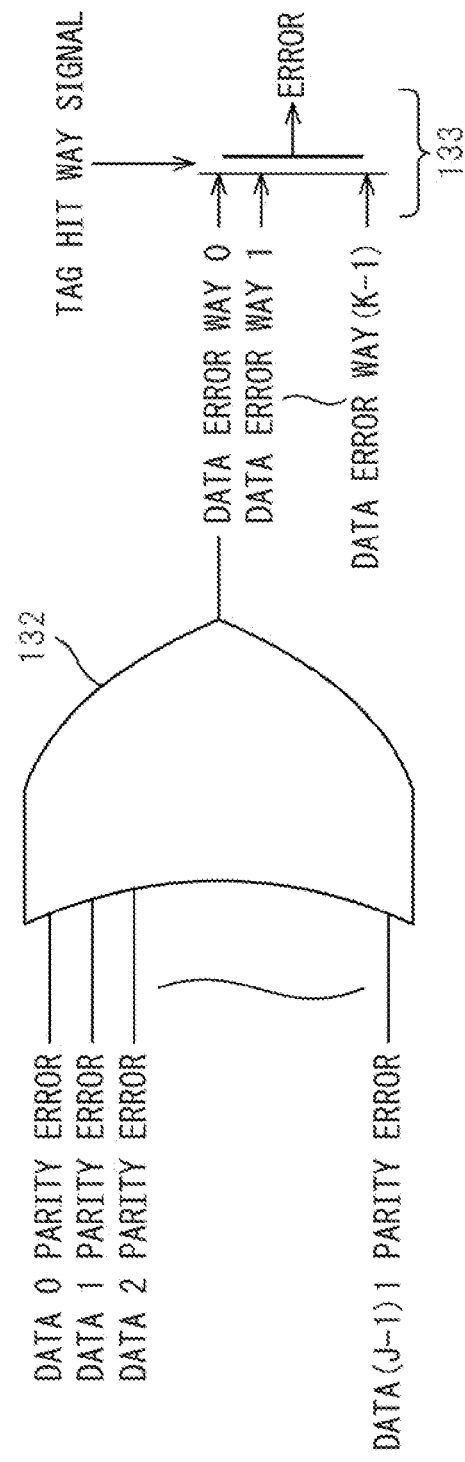
FIG.15

|  | 26 | 27 | 28 | 29 | 30 | 31 | 32 | 33 | 34 | 35 | 36 | 37 | 38 |
|---|---|---|---|---|---|---|---|---|---|---|---|---|---|
| REQUEST |  |  |  |  | MI-1ST | | | | | | | | |
|  |  |  |  |  | P | T | M | B | R | | | | |
|  |  |  |  |  |  |  |  | MI-2ND | | | | | |
|  |  |  |  |  |  |  |  | P | T | M | B | R | |
| RERUN-REQ |  |  |  |  |  |  |  |  |  |  |  |  |  |
| STV | L |  |  |  |  |  |  |  |  |  |  |  |  |
| WID | L |  |  |  |  |  |  |  |  |  |  |  |  |
| SBE | L |  |  |  |  |  |  |  |  |  |  |  |  |
| IBR-CE | L |  |  |  |  |  |  |  |  |  |  |  |  |
| RERUN | L |  |  |  |  |  |  |  |  |  |  |  |  |

|  | 39 | 40 | 41 | 42 | 43 | 44 | 45 | 46 | 47 | 48 | 49 | 50 | 51 |
|---|---|---|---|---|---|---|---|---|---|---|---|---|---|
| REQUEST |  | 1st-flow(INT) | | | | | | | 2nd-flow(INT) | | | | |
|  |  | P | T | M | B | R |  |  | P | T | M | B | R |
| RERUN-REQ |  | H |  |  |  |  |  |  | H |  |  |  |  |
| STV |  |  |  |  |  |  |  |  |  |  |  |  | H |
| WID | L |  |  |  |  | (71) |  |  |  |  |  |  |  |
| SBE |  |  |  |  |  |  |  |  |  |  |  |  |  |
| IBR-CE | L |  |  |  | H |  |  |  |  |  |  |  |  |
| RERUN | L |  |  |  |  |  |  |  |  |  |  |  |  |

FIG.22

| | 39 | 40 | 41 | 42 | 43 | 44 | 45 | 46 | 47 | 48 | 49 | 50 | 51 |
|---|---|---|---|---|---|---|---|---|---|---|---|---|---|
| REQUEST | | 1st-flow[NT] | | | | | | | 2nd-flow[NT] | | | | |
| | | P | T | M | B | R | | | P | T | M | B | R |
| RERUN-REQ | | H | | | | | | | H | | | | |
| STV | | | | | | | | | | | | | H |
| WID | L | | | | | (71) | | | | | | | |
| SBE | | | | | | | | | | | H | | |
| IBR-CE | L | | | | H | | | | | | | | |
| RERUN | L | | | | | | | | | | | | |
| | L | | | | | | | | | | | | |

…

PROCESSOR AND METHOD OF CONTROL OF PROCESSOR

CROSS-REFERENCE TO RELATED APPLICATION

This application is based upon and claims the benefit of priority of the prior Japanese Patent Application No. 2009-260950, filed on Nov. 16, 2009, the entire contents of which are incorporated herein by reference.

FIELD

The embodiment discussed herein is related to a processor and a method of control of a processor.

BACKGROUND

In recent years, to increase the processing speed of processors used in processing systems, processors using a pipeline system have been used. In the pipeline system, a processor has a plurality of pipelines (instruction control pipeline, processing pipeline, branch control pipeline, etc.) for realizing its functions. Each pipeline is divided into a plurality of stages. Each stage includes a circuit unit for realizing a predetermined process. It operates so as to end the predetermined process assigned to that stage within a time called as a "cycle time" comprised of the reciprocal of the operating frequency. Further, the output signal of the stage relating to the preceding process is, for example, used as an input signal of a stage relating to a succeeding process.

As one technique for increasing the processing speed of a processor using the pipeline system, a tag RAM (random access memory) and a cache memory operating so as to access a data RAM in 1 cycle have been proposed.

[Patent Document 1] Japanese Laid-open Patent Publication No. 2004-171177

SUMMARY

According to an aspect of the embodiment, a processor including: a first storage unit that stores data; an error detection unit that detects the occurrence of error in data read out from the first storage unit; a second storage unit that stores data read out from the first storage unit based on a load request; a rerun request generation unit that generates a rerun request of a load request to the first storage unit in the same cycle as the cycle in which error of data is detected when the error detection unit detects the occurrence of error in data read out from the first storage unit by the load request; and an instruction execution unit that retransmits the load request to the first storage unit when data in which error is detected and a rerun request are given.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and other objects and features of the present invention will become clearer from the following description of the preferred embodiments given with reference to the attached drawings, wherein:

FIG. 2 is an example of block diagram of an instruction unit and L1 cache;
FIG. 3 is an example of state transition diagram of the transition in a data request to a pipeline;
FIG. 4 is an example of truth table defining priority control;
FIG. 15 is an example of error check circuit;
FIG. 20 is an example of time chart illustrating pipeline processing when a rerun request is issued;
FIG. 21 is an example of time chart illustrating an example of pipeline processing when a rerun request is issued;
and
FIG. 22 is an example of time chart illustrating pipeline processing when a rerun request is issued.

DESCRIPTION OF EMBODIMENTS

As described previously, processing for running an error check on data read out from a data RAM and processing for judging and notifying usage permission for the data read out to the processor in accordance with the result of the error check are both continuous processings, so these two processings cannot be completed within 1 cycle. The above two processings take at least a total of 2 cycles or more.

Figure 1:
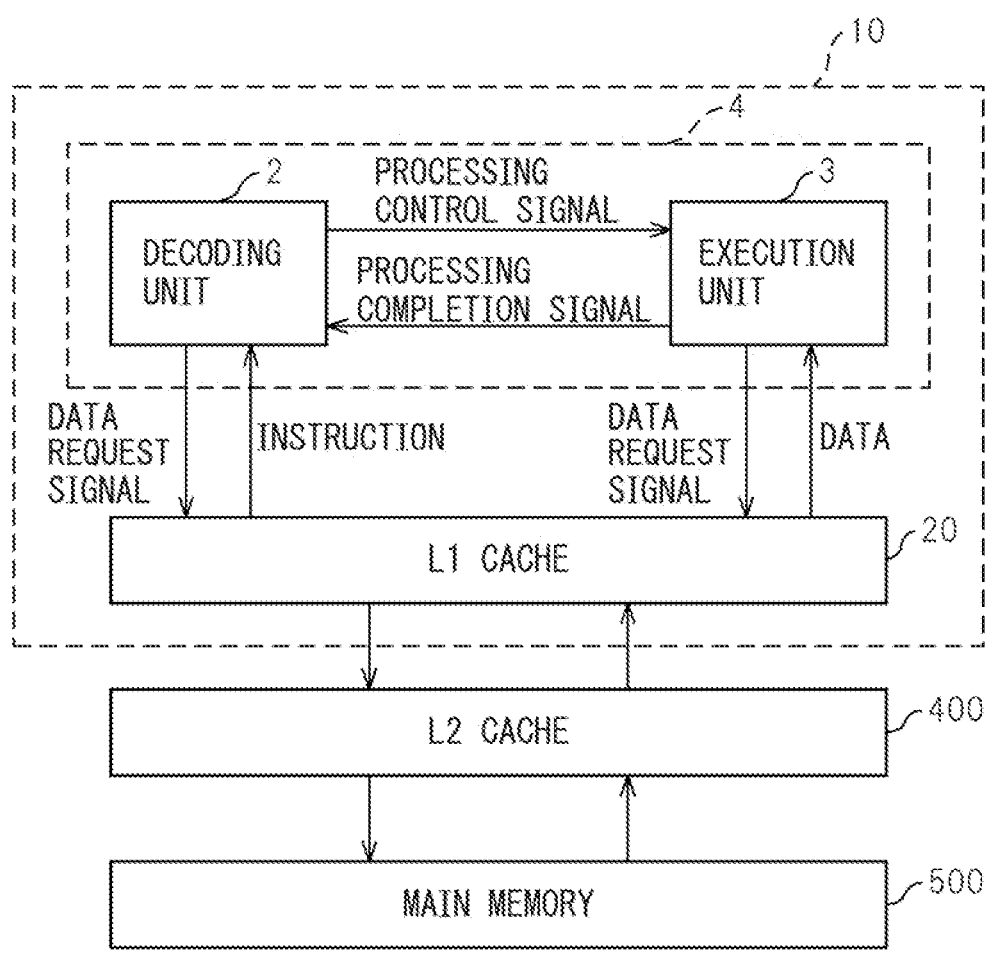
FIG. 1 is an example of block diagram of a processor.

Preferred embodiments of the present invention will be explained with reference to accompanying drawings. FIG. 1 is an example of block diagram of a processor. The processor 10 illustrated in FIG. 1 has an instruction execution unit 4 and an L1 cache 20. The instruction execution unit 4 has a decoding unit 2 and an execution unit 3. One example of the L1 cache 20 will be explained later using FIG. 2.

The decoding unit 2 supplies a "data request signal" to the L1 cache 20 and reads out an "instruction". The decoding unit 2 decodes the "instruction (operating code: opcode)" read out from the L1 cache 20 and supplies, as a "processing control signal" to the execution unit 3, the decoded result of the instruction and a register address in which the operands on which the instruction is to be run are stored. As instructions for decoding, for example, there are load instructions, store instructions, etc. to the L1 cache 20 etc.

The execution unit 3 extracts data of the operands from the register specified by the register address at a register file inside the execution unit 3 and processes the data in accordance with the decoded instruction. The execution unit 3, by executing the decoded instruction, sends the "data request signal" to the L1 cache 20. The "data request signal" will be called as an "EXT request" below. The "EXT request" may be a load instruction, store instruction, prefetch instruction, etc.

The L1 cache 20, for example, supplies the requested data to the execution unit 3 in accordance with the load instruction. When the execution unit 3 finishes executing the instruction, it supplies a "processing completion signal" to the decoding unit 2 so as to obtain the next processing control signal.

The L1 cache 20 is a higher level memory of an L2 cache 400 and caches part of the data held by the L2 cache 400. That is, the L2 cache 400 holds data including data cached by the L1 cache 20. The L2 cache 400 is a higher level memory of the main memory 500 and caches part of the data held by the main memory 500. That is, the main memory 500 holds data including data cached by both the L2 cache 200 and the L1 cache 20.

The case where an instruction or data for which the decoding unit 2 or execution unit 3 accesses the memory is present in the L1 cache 20 will be called as a "cache hit" below. The case where an instruction or data for which the decoding unit 2 or execution unit 3 accesses the memory is not present in the L1 cache 20 will be called as a "cache miss" below. When a cache miss occurs, the cache miss data to the L1 cache 20 from the L2 cache 400 or main memory 500 at the lower level from the L1 cache 20 is read out.

FIG. 2 is an example of block diagram of an instruction unit and L1 cache. The instruction execution unit 4 has a data buffer 5. The data buffer 5 is a buffer that holds instructions read out from the L1 cache 20.

The L1 cache 20 has a cache controller 200, a clock control unit 110, a data RAM 120, an error check circuit 130, a selection circuit 140, a rerun request generation unit 150, a control unit 180, an L2 order holding unit 190, and an L2 request holding unit 195. The cache controller 200 has a pipeline 100 and a control unit 180.

The pipeline 100 has a translation look-aside buffer (TLB) 35, a tag RAM 30, a comparison circuit 40, and a control signal generation unit 50.

As stated, the instruction execution unit 4 has the data buffer 5. The data buffer 5 also holds data supplied from the selection circuit 140.

The pipeline 100 includes a priority circuit 25, a tag RAM 30, a TLB 35, and a comparison circuit 40. The above components included in the pipeline 100 are assigned to a plurality of stages. For example, the priority circuit 25 is assigned to a "P (Priority) stage", the tag RAM 30 and TLB 35 are assigned to a "T (Tag) stage", and the comparison circuit 40 is assigned to an "M (Match) stage". An example of the pipeline 100 will be explained later using FIG. 5, FIG. 7, and FIG. 8.

The clock control unit 110 supplies a clock to the data RAM 120 when there is an access request for data held by the data RAM 120 or when otherwise it is necessary to supply a clock to the data RAM 120. Details of the clock control unit 110 will be explained later using FIG. 14.

Details of the TLB 35, the tag RAM 30, the data RAM 120, and the error check circuit 130 will respectively be explained later using FIG. 11, FIG. 12, FIG. 13, and FIG. 15.

The comparison circuit 40 is a circuit that compares an absolute address supplied from the TLB 35 with an absolute address supplied from the tag RAM 30 and judges if the two tags match. When the tag supplied from the TLB 35 and the tag supplied from the tag RAM 30 match, the comparison circuit 40 supplies the selection circuit 140 with a tag hit way signal specifying the way at which the cache hit occurred.

The L2 request holding unit 195 holds requests used when loading data from the L2 cache 400.

The L2 order holding unit 190 holds a request for deleting an entry at a corresponding cache line in the L1 cache 20 when a cache line from the L2 cache 400 is deleted. Below, this delete request will be called an "L2 order". An L2 order dequeued from the L2 order holding unit 190 is held at a later explained P (priority) cycle order address register (PSXR).

The rerun request generation unit 150 and the control signal generation unit 50 will be respectively explained later using FIG. 16 and FIG. 17. When a cache error occurs, the control unit 180 performs processing to load data at the L2 cache 400 and store the loaded data at the L1 cache.

FIG. 3 is an example of state transition diagram of the transition in a data request to a pipeline. A state S101 indicates a state where the priority circuit 25 is receiving a request signal. A state S103 indicates a state where the priority circuit 25 waits for a request to be input to the next stage TLB 35, tag RAM 30, and clock control unit 110.

When the priority circuit 25 receives the above four types of requests (T102) and enters a request input wait state (S103), the priority circuit 25 selects the request to be supplied to the next stage in accordance with the truth table illustrated in FIG. 4. The states S101 and S103 illustrated in FIG. 3 are mounted by latch circuits prepared for each type of request. The transition T102 from the state S101 to the state S103 arises due to setting a request at the priority circuit 25. The transition T104 from the state S103 to the state S101 arises due to the supply of a request to the next stage.

The priority circuit 25 illustrated in FIG. 2 receives an EXT request, BIS request, MI request, and INT request, selects the requests based on a predetermined priority order, and supplies the selected requests to the next stage TLB 35, tag RAM 30, and clock control unit 110.

An EXT request is a request given from the instruction execution unit 4. A load request, store request, prefetch request, or other memory access request is included in it.

A BIS request is a request given from the L2 cache 400 for erasing a line of the L1 cache 20. That is, a BIS request is a request when erasing a line relating to an error when an error is detected in the data RAM 120.

An MI request is a request given from the cache controller 200 and writing data loaded from the L2 cache 400 in the data RAM. The cache controller 200 issues the MI request for a line concerned after the L2 cache 400 issues the BIS request.

An INT request is a request given from the pipeline 100 for executing predetermined processing using data before the pipeline 100 is stopped by an EXT request after it is stopped.

FIG. 4 is an example of truth table defining priority control. A "0" in the truth table 1000 indicates that a request is in a request reception state (S101). A "1" in the truth table 100 indicates that a request is in a request input wait state. An "*" in the truth table 1000 indicates that no matter what state a request is in, this has no bearing on the determination of the priority order ("don't care").

A column R101 illustrated in FIG. 4 indicates that if an MI request is in the request input wait state (S103), the MI request is input to the next stage regardless of the other requests.

A column R102 illustrated in FIG. 4 indicates that when a BIS request is in the request input wait state (S103) and the MI request is in the request reception state (S101), the BIS request is input at the next stage.

A column R103 illustrated in FIG. 4 indicates that when an INT request is in the request input wait state (S103) and the MI request and BIS request are in the request reception state (S101), the INT request is input at the next stage.

A column R104 illustrated in FIG. 4 indicates that when an MI request, BIS request, and INT request are in the request reception state (S101), the EXT request is input at the next stage. In this way, the priority circuit 25 inputs requests to the next stage in the priority order of MI request>MIS request>INT request>EXT request (priority orders of larger requests illustrated by inequality signs being higher).

Figure 5:
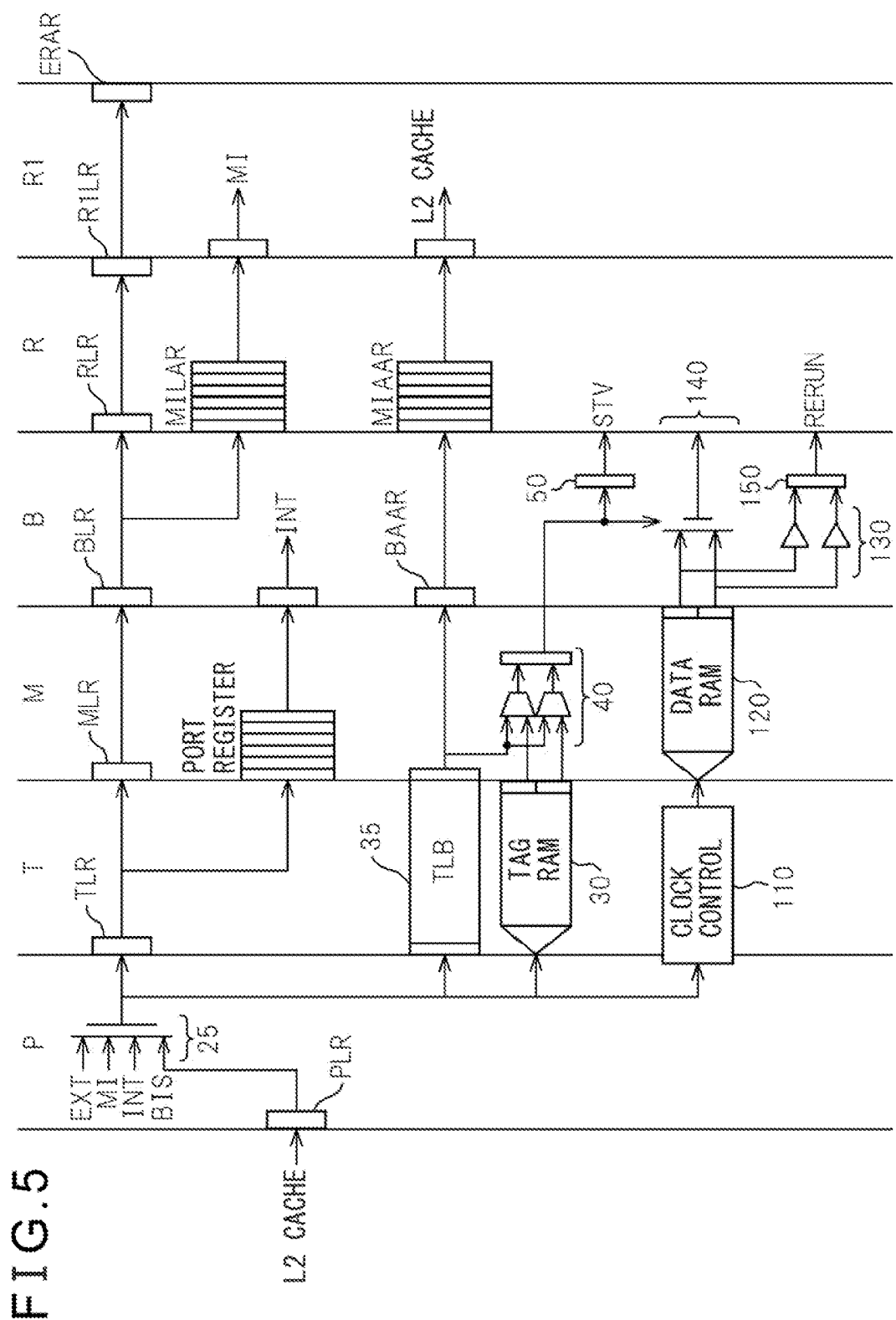
FIG. 5 is an example of flow diagram of a routine for execution of address control processing in an L1 cache.

FIG. 5 is an example of flow diagram of a routine for execution of address control processing in an L1 cache FIG. 5 illustrates an example of address control of a pipeline, that is, an address control pipeline. In FIG. 5, the components of the L1 cache 20 illustrated in FIG. 2 are divided into the pipeline stage "P (Priority)", "T (Tag)", "M (Match)", "B (Branch)", "R (Result)", and "R1". The clock cycles are set based on the longest time among the processing times taken at the different stages of the pipeline. Due to this, all of the stages operate at the same cycle time synchronized with the clocks.

The stages of "P (Priority)", "T (Tag)", "M (Match)", "B (Branch)", "R (Register)", and "R1" respectively have the staging latches of logical address registers PLR (Priority stage Logical Register), TLR (Tag stage Logical Register), MLR (Match stage Logical Register), BLR (Branch stage Logical Register), RLR (Register stage Logical Register), and R1LR (R1 stage Logical Register). These staging latches of the logical address registers are synchronized with a clock supplied from the outside, hold logical addresses for certain time periods, then supply the logical addresses to the next stage pipeline address registers.

The port register holds an EXT request. The EXT request held at the port register is utilized as an INT request after pipeline suspension.

A MILAR (Move In Logical Address Register) is a register holding the logical address of data written into the tag RAM 30. A MIAAR (Move In Absolute Address Register) is a register holding the physical address of data written into the tag RAM 30 when a cache miss occurs. The cache controller 200 sends an MI (Move In) request requesting the data of the physical address held at the MIAAR to the L2 cache 400 through the L2 request holding unit 195. The data obtained from the L2 cache 400 is written into the tag RAM 30 by the MI request.

A BAAR (Branch cycle Absolute Address Register) is a register holding a physical address input to the MIAAR.

An ERAR (ERror Address Register) is a register holding a virtual address in the case when an error occurs in the memory access. When a cache miss occurs at the comparison circuit 40, the cache controller 200 reports an error to the L2 cache 400. When an error is reported, the L2 cache 400 issues a request for deleting the entry of the cache line in which an error occurred. This request is called as a "L2 order". The L1 cache 20 erases a line by a BIS request when receiving an L2 order through the L2 order holding unit 190. The control unit 180 notifies the L2 cache 400 that the line has been erased.

The T stage includes the TLB 35 and tag RAM 30. The clock control unit 110 is not included in the pipeline 100, but performs processing in the cycles of the P or T stage.

The M stage includes a selection circuit 140. The data RAM 120 is not included in the pipeline 100, but operates at the cycles of the M stage. The B stage includes the error check circuit 130, the priority circuit 25, and the rerun request generation unit 150. The R stage includes the circuit supplying a request to the data buffer 5.

At the P stage, the priority circuit 25 supplies any one of the requests of EXT, BIS, INT, and MI selected at the P stage to the TLB 35 and tag RAM 30 in accordance with the priority order of the truth table illustrated in FIG. 3.

Figure 6:
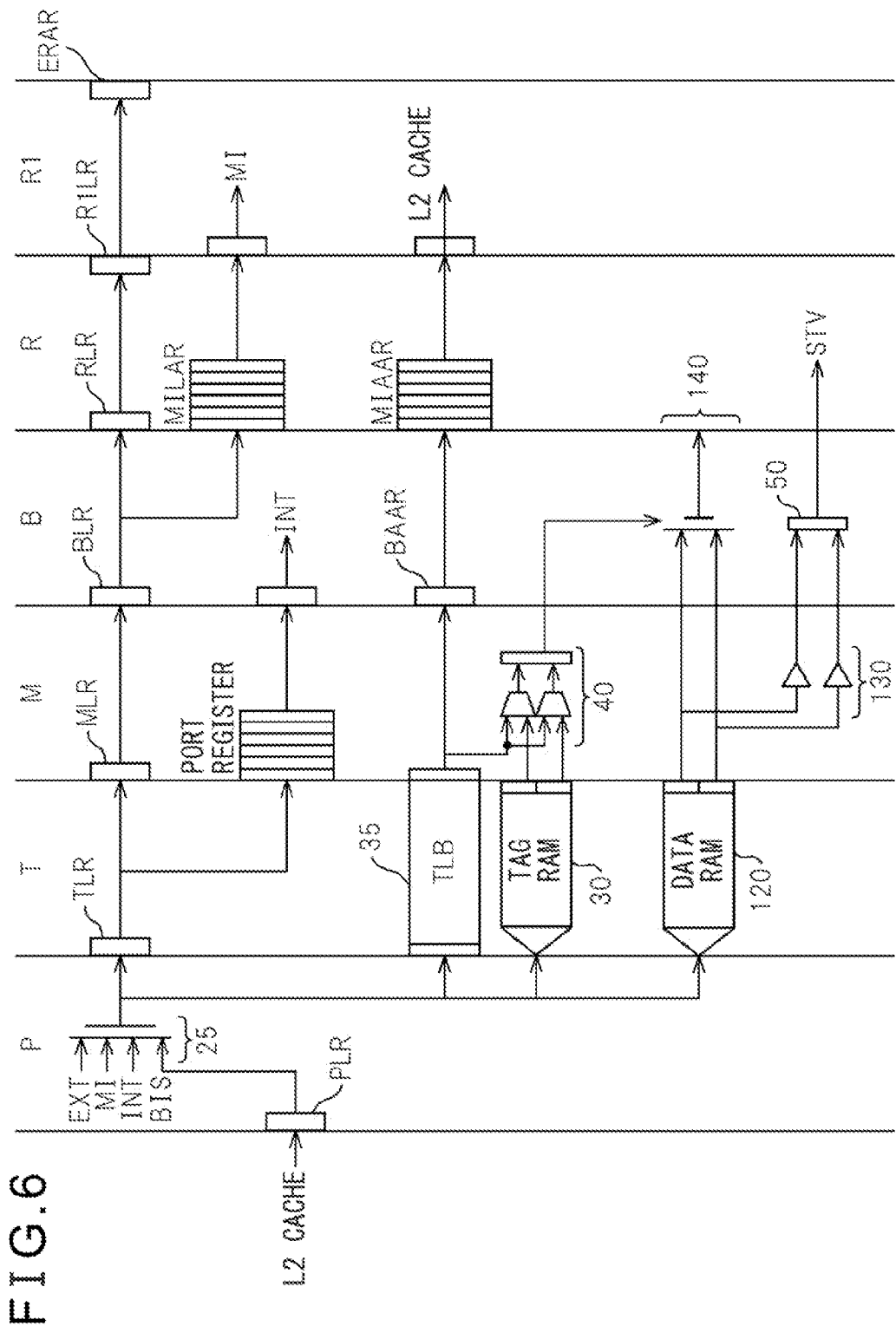
FIG. 6 is an example of flow diagram of a routine for execution of address control processing in an L1 cache.

FIG. 6 is an example of flow diagram of a routine for execution of address control processing in an L1 cache FIG. 6 is illustrates an example of address control by the pipeline when using the error check circuit to generate a usage permission signal, that is, STV (store valid) signal. In FIG. 6, among the components of the L1 cache 20 illustrated in FIG. 2, the clock control unit 110 and rerun request generation unit 150 are not illustrated.

Figure 19:
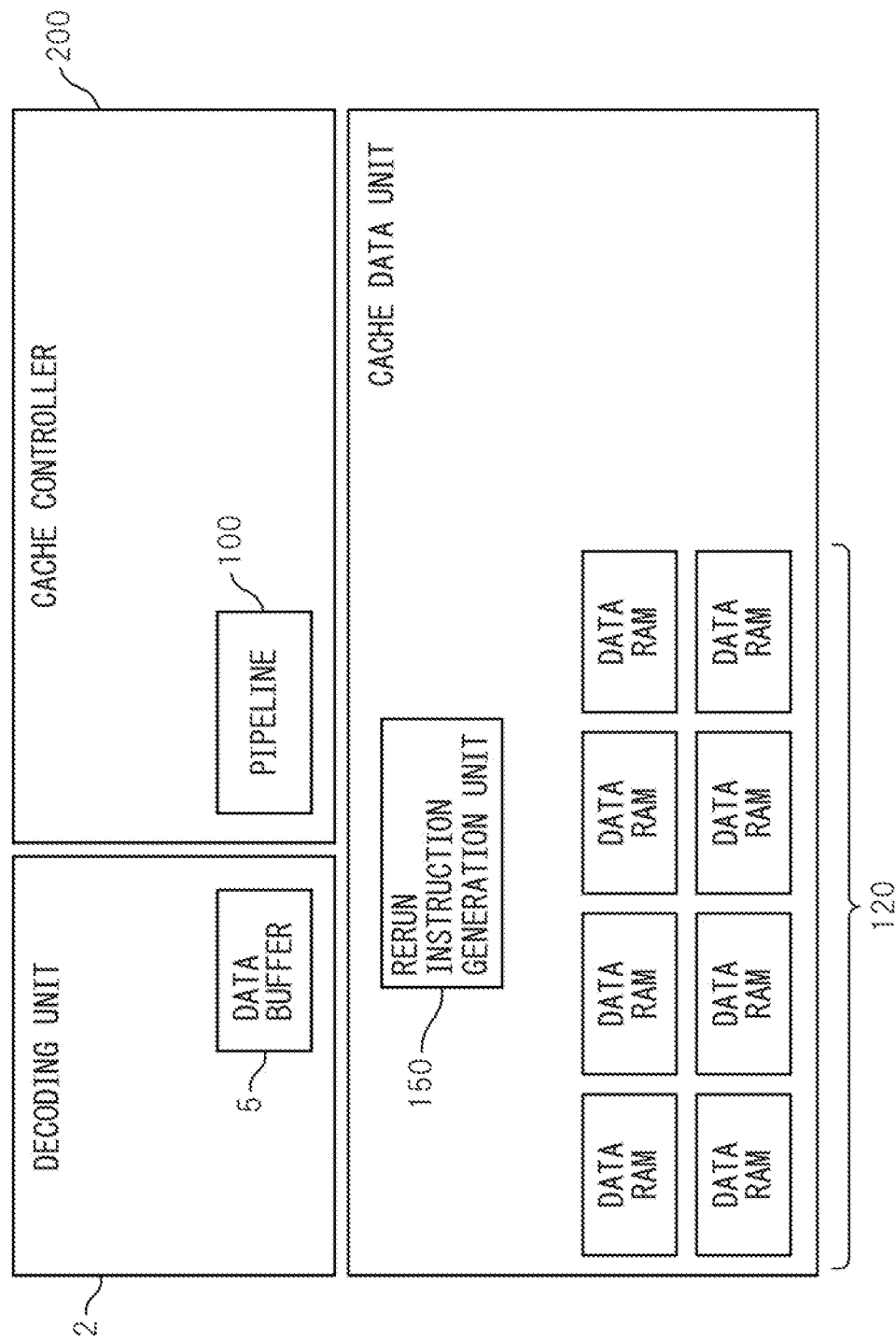
FIG. 19 is an example of layout chart of the circuit configuration of a processor.

When the control signal generation unit 50 is configured to receive an error detection signal from the error check circuit 130 and output the above STV signal, the control signal generation unit 50 is arranged after the error check circuit 130. The control signal generation unit 50, as explained later in FIG. 19, is arranged inside the pipeline 100 and is not arranged in the vicinity of the data RAM 120. Accordingly, the transmission path between the data RAM 120 and the control signal generation unit 50 is long, so the control signal generation unit 50 is arranged not at the M stage, but at the B stage. Furthermore, the error check circuit 130 is arranged at the M stage.

For this reason, the data RAM 120 arranged in front of the error check circuit 130, as illustrated in FIG. 5, is not arranged at the M stage, but is arranged at the T stage. As a result, the clock control unit 110 can no longer be arranged between the priority circuit 25 and the data RAM 120.

In the above way, the processor 10 can provide after the error check circuit 130 not the control signal generation unit 50, but the rerun request generation unit 150 and thereby provide the clock control unit 110 for clock control to the data RAM 120. The clock control unit 110 does not supply a clock to the data RAM when there in no access request to the data held by the data RAM 120, so by providing the clock control unit 110, the processor 10 can reduce the power consumption.

Figure 7:
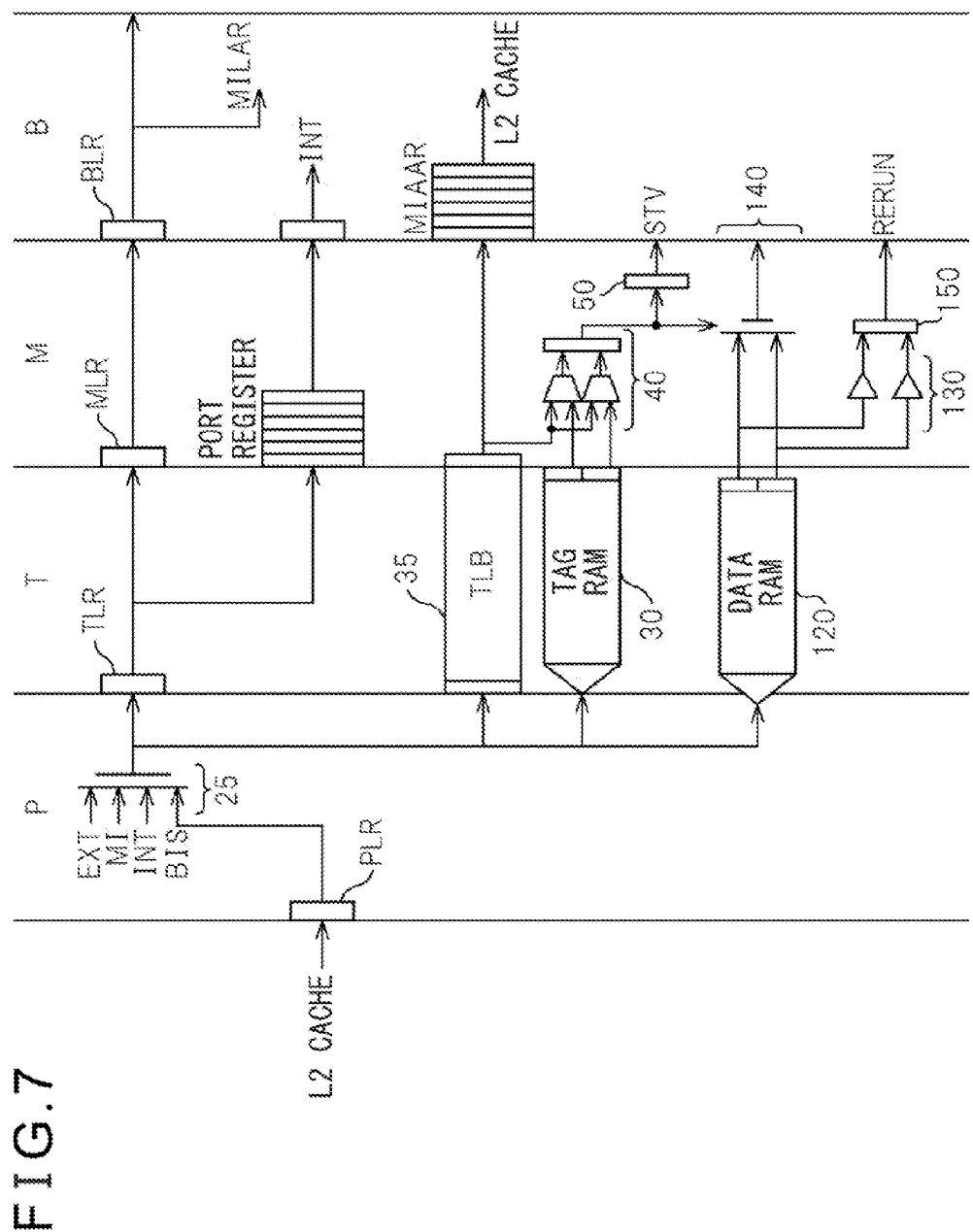
FIG. 7 is an example of flow diagram of a routine for execution of address control processing in an L1 cache.

FIG. 7 is an example of flow diagram of a routine for execution of address control processing in an L1 cache. FIG. 7 is illustrates an example of address control of a pipeline minus the clock control unit illustrated in FIG. 5. By removing the clock control unit illustrated in FIG. 5 from the T stage, the data RAM 120 operates at the T stage. Further, the error detected from the error check circuit 130 is received by the rerun request generation unit 150 at the outside of the pipeline 100 and used by it to generate a rerun request, so the rerun request generation unit 150 can be arranged at the M stage. For this reason, the error check circuit 130 and rerun request generation unit 150 after the data RAM 120 can be arranged at the M stage, and the STV signal and RERUN signal can be sent to the B stage. Accordingly, the need for the R stage for transmission of the STV signal or RERUN signal illustrated in FIG. 5 and FIG. 6 can be eliminated.

In this way, unlike the pipeline control illustrated in FIG. 6, in the pipeline control illustrated in FIG. 7, a load operation of data becomes possible in a shorter cycle time. That is, the processor 10 can change to the pipeline control illustrated in FIG. 7 so as to improve the cycle time (operating frequency) when the load operation of data becomes a bottleneck in improvement of the cycle time (operating frequency) in the pipeline control illustrated in FIG. 6.

Figure 8:
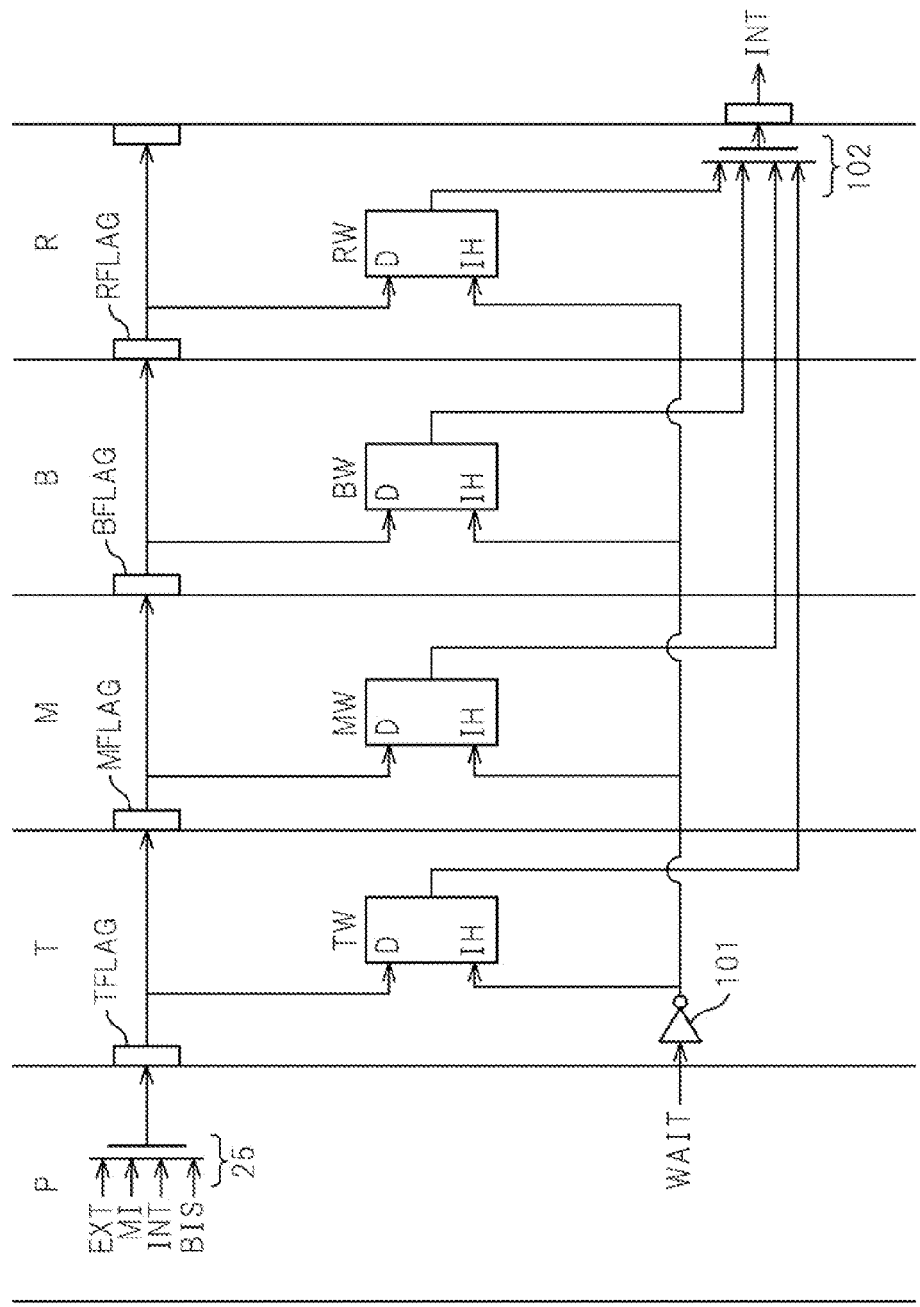
FIG. 8 is an example of flow diagram of a routine for execution of flag control processing in an L1 cache.

FIG. 8 is an example of flow diagram of a routine for execution of flag control processing in an L1 cache. FIG. 8 illustrates an example of flag control in a pipeline. For the pipeline 100b illustrated in FIG. 8, a circuit in a pipeline relating to flag signal control is illustrated. The pipeline 100b has an inverter 101, flag signal latch TFLAG (tag flag), MFLAG (match flag), BFLAG (branch flag), RFLAG (register flag), and priority circuit 102.

The stages of "P", "T", "M", "B", "R", and "R1" respectively have staging latches for holding flag signals, that is, the flag signal latches TFLAG, MFLAG, BFLAG, and RFLAG. Flag signals are control signals indicating attribute information, identification information, and other status information generated based on the pipeline processing a request. The flag signals will be explained later using FIG. 9. Each flag signal latch has a data input terminal, that is, a D (Data) terminal to which the flag signal is input, and a control terminal, that is, an IH (InHibit) terminal to which the wait signal is input. When the wait signal input to the IH terminal is the signal level "low", the flag signal input from the D terminal of the flag signal latch is written. When the wait signal input to the IH terminal is the signal level "high", writing of the flag signal input from the D terminal of the flag signal latch is prohibited.

Note that, below, a signal level "low" will be referred to as "L" and a signal level "high" will be referred to as "H".

The input signal of the IH terminal is a wait signal inverted by the NOT circuit, that is, the inverter 101. The wait signal is a signal for making the operation of the pipeline 100 stop and is generated by the control signal generation unit 50 illustrated in FIG. 2. Accordingly, when the wait signal for stopping the operation of the pipeline becomes "H", a flag signal is written into the flag signal latch. The conditions for generation of the wait signal by the control signal generation unit 50 will be explained later using FIG. 17.

When the priority circuit 25 inputs any received request to the pipeline 100, the flag signal moves along with the input of the clock signal to the TFLAG, MFLAG, BFLAG, and RFLAG in that order. However, when a pipeline processing disabling signal, that is a wait signal supplied to the inverter 101, each flag signal latch stores a flag signal together with the input of the clock signal into the holding circuit TW, MW, BW, and RW corresponding to each stage.

When resuming the pipeline after the pipeline is once stopped, flag signals are output from the holding circuits TW, MW, BW, and RW and are further input to the pipeline as INT requests. The requests are input from the oldest one, so are input in the order of RW, BW, MW, and TW.

Figures 9, 10:
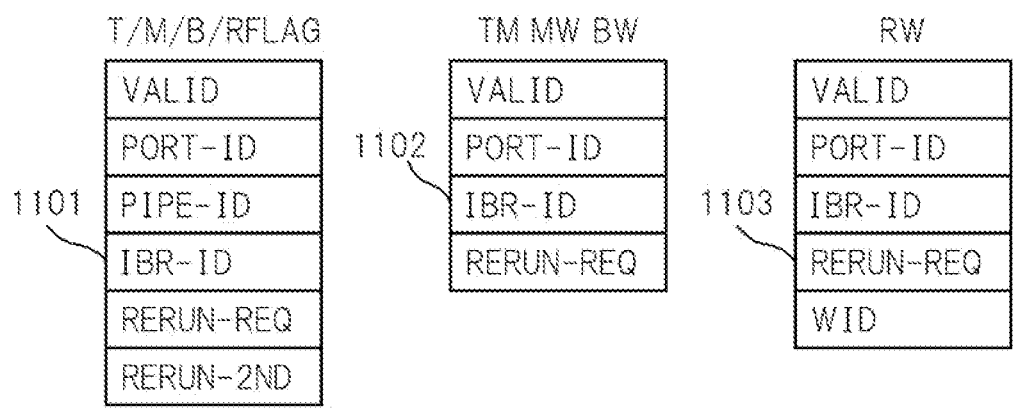
FIG. 9 is a view illustrating an example of flag signals used for pipeline control.
FIG. 10 is an example of truth table defining priority control for selection of a flag signal held in a holding circuit.

FIG. 9 is a view illustrating an example of flag signals used in pipeline control. Flag signals 1101 are signals held in the TFLAG, MFLAG, BFLAG, and RFLAG. The flag signals 1101 include a "VALID" signal, "port ID" signal, "pipe ID" signal, "instruction unit ID" signal, "rerun request" signal, and "rerun second" signal.

An "H" "VALID" signal indicates that a valid request is flowing through the pipeline stage. A "port ID (port register-ID)" signal is a signal specifying the port register illustrated in FIG. 5. As explained later in FIG. 17, when the wait signal for stopping the operation of the pipeline becomes "H", an "H" "VALID" signal flows through the pipeline.

The "pipe ID (PIPE-ID)" signal indicates the type of the request. For example, the "pipe ID" signals indicating, by hexadecimal notation, "0x3", "0x5", "0xD", and "0xF" respectively indicate an MI request, BIS request, INT request, and EXT request. The "instruction ID (IBR-ID)" signal shows the identification number of the instruction execution unit 4 of the destination returning the request. The "instruction ID" signal is added to the EXT request when the instruction execution unit 4 supplies the EXT request to the L1 cache 20.

The rerun request, that is, the RERUN-REQ signal, is a signal which the instruction execution unit 4 that receives the rerun request, that is, RERUN signal, supplies to the pipeline 100.

The rerun request second, that is, the RERUN-2nd signal, is a signal obtained by decoding 71 when the later mentioned flow ID, that is, WID signal, indicates 71. "WID=71" results from the preceding flow being due to a rerun request and specifies that the flow is one kept waiting without the occurrence of a cache hit and error. Expressed in another way, "WID=71" indicates that a rerun second signal finished writing data into the data buffer 5 in the preceding flow and that the current flow is a flow for returning an STV signal. Accordingly, the pipeline 100 decodes the WID signal received together with the INT request, makes the RERUN-2nd signal "H", and runs as one flag signal a RERUN-2nd signal to the different stages of the pipeline.

Flag signals 1102 are flag signals held at TW, MW, and BW. The attribute or identification information that the flat signals 1102 contain includes the above VALID, port ID, pipe ID, and instruction unit ID. Flag signals 1103 are flag signal held at RW. The attribute or identification information that the flag signals 1103 contain includes the above VALID, port ID, pipe ID, instruction unit ID, and WID.

WID specifies the reason why the pipeline has stopped and includes the following types of reasons. "WID=10" indicates the pipeline has been suspended due to a cache miss. The pipeline 100 waits until data is loaded from the L2 cache 400. "WID=60" indicates that the pipeline has been interrupted due to a TLB miss. "WID=70" indicates that the pipeline has been suspended due to a cache error. "WID=71" indicates that the initial flow receiving the rerun request ended without a cache hit and error.

FIG. 10 is a truth table defining the priority order of selection of flag signals held at the holding circuits RW, BW, MW, and TW. The priority circuit 102 selects the flag signals held at the flag signal addresses in accordance with the truth table 1200 illustrated in FIG. 10. A "*" in the truth table 1000 indicates no relevancy to the determination of the priority order ("don't care"). A "0" in the truth table 1200 indicates that the flag signal is held at the holding circuit. A "1" in the truth table 1200 indicates that the flag signal is not held at the holding circuit.

The flag signals held at the RW, as illustrated by the row L1201, are always selected by the priority circuit 102. The flag signals held at the BW, as illustrated by the row L1202, are selected by the priority circuit 102 when there are no flag signals at the RW. The flag signals held at the MW, as illustrated by the row L1203, are selected by the priority circuit 102 when there are no flag signals at the BW and RW. The flag signals held at the TW, as indicated by the row L1203, are selected by the priority circuit 102 when there are no flag signals at the MW, BW, and RW.

Figure 11:
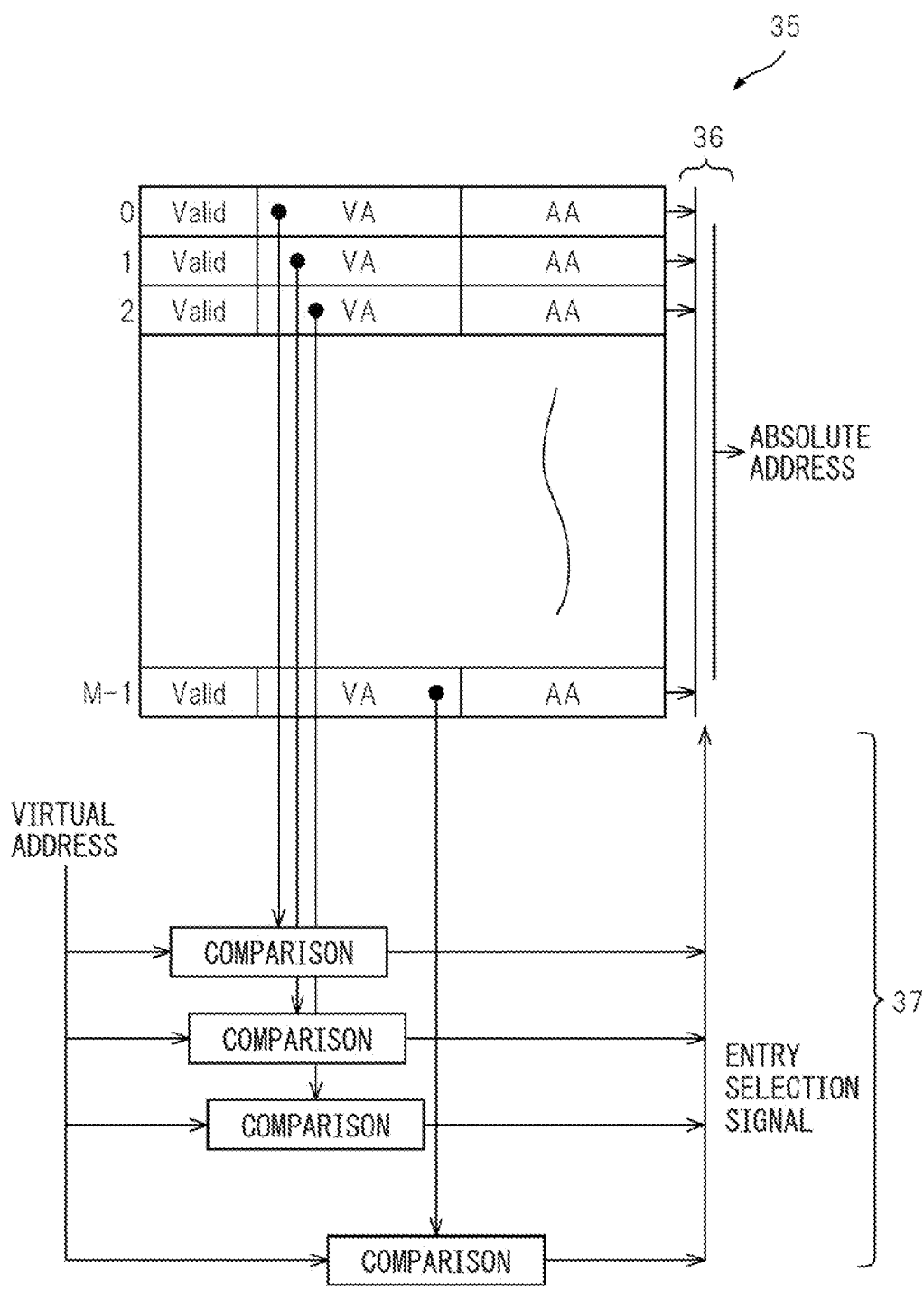
FIG. 11 is an example of block diagram of a TLB.

FIG. 11 is an example of block diagram of a TLB. The TLB 35 has M (M is an integer) number of entries. Each entry includes a valid bit (valid) indicating if the entry is valid or not, a virtual address (VA), and an absolute address (AA). The TLB 35 outputs an entry selection signal which selects an entry at which the virtual address used for access and the stored virtual address match in the comparison unit 36. The selection unit 37 outputs the absolute address held at the entry selected by the entry selection signal. The output absolute address is supplied to the selection circuit 140.

In a virtual address actually used for a tag match, depending on the page size, a predetermined lower part is not used for the tag match. For example, with a 8 KB page size, the virtual address used for the tag match becomes 50 bit virtual address <63:14> out of the 64-bit virtual address. When the virtual address is on the TLB 35, the TLB 35 supplies a TLB hit signal to the control signal generation unit 50 and rerun request generation unit 150.

Figure 12:
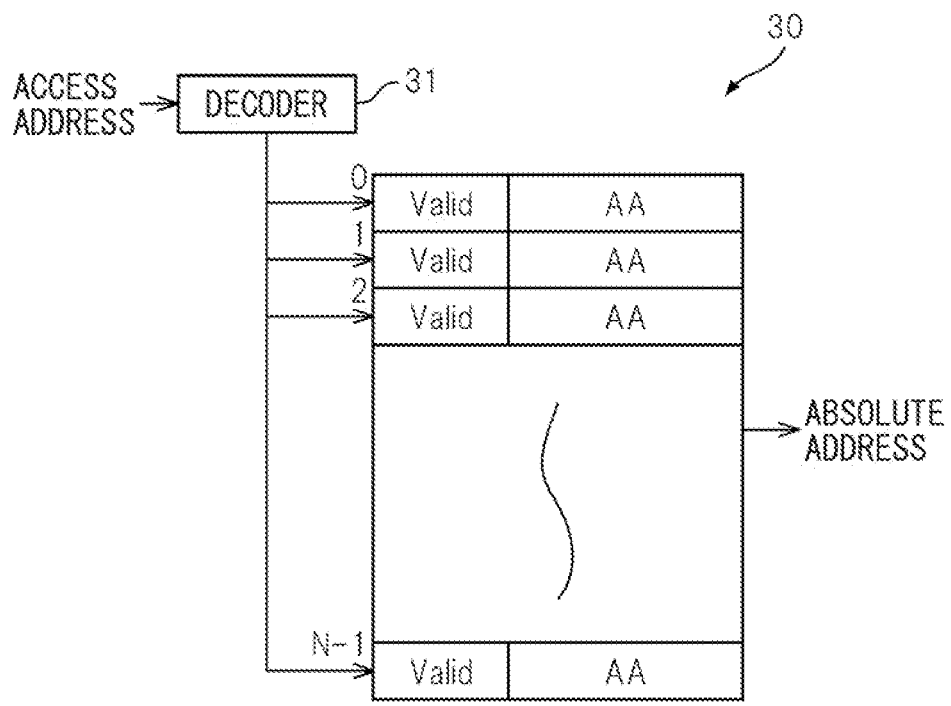
FIG. 12 is an example of block diagram of a tag RAM.

FIG. 12 is an example of block diagram of a tag RAM. The tag RAM 30 has N (N is an integer) number of entries. Each entry includes a valid bit (valid) indicating if the entry is valid or not and an absolute address (AA). The decoder 31 of the tag RAM 30 decodes part of the 64-bit virtual address comprising the access address (for example, virtual address <13:7>) and selects an entry. The tag RAM 30 outputs the absolute address from the selected entry. The tag RAM has a plurality of ways. In the case of a set associative type cache memory where the entries of the different ways are selected for a single index, the same number of absolute addresses as the number of ways are output. The output absolute addresses are output to the selection circuit 140.

Figure 13:
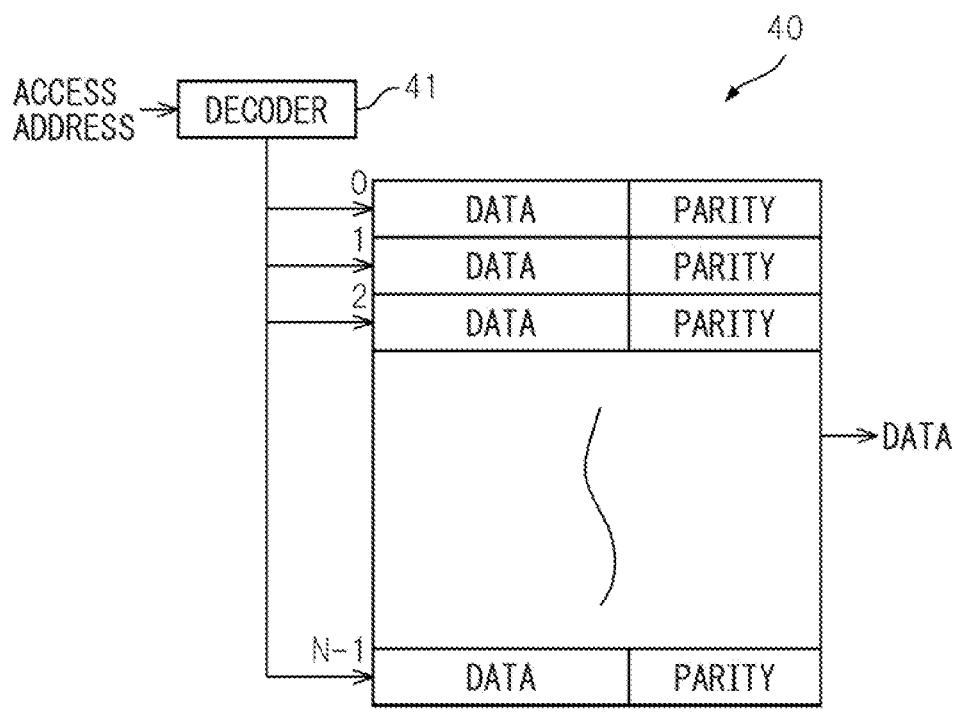
FIG. 13 is an example of block diagram of a data RAM.

FIG. 13 is an example of block diagram of a data RAM. The data RAM 120 has the same N number (N is a positive integer) of entries as the tag RAM. Each entry includes data and a parity bit of data. The decoder 41 of the data RAM 120 decodes the same access address as the access address supplied to the tag RAM 30 and selects an entry. The data RAM 120 outputs data from the selected entry. The output data is supplied to the error check circuit 130 and selection circuit 140.

The data RAM 120 can also use a plurality of RAM's for forming a single way when a single RAM is not enough for securing the data width of one line. For example, when four RAMs form a single way and there are two ways, 4×2=8 number of RAMs become necessary.

Figure 14:
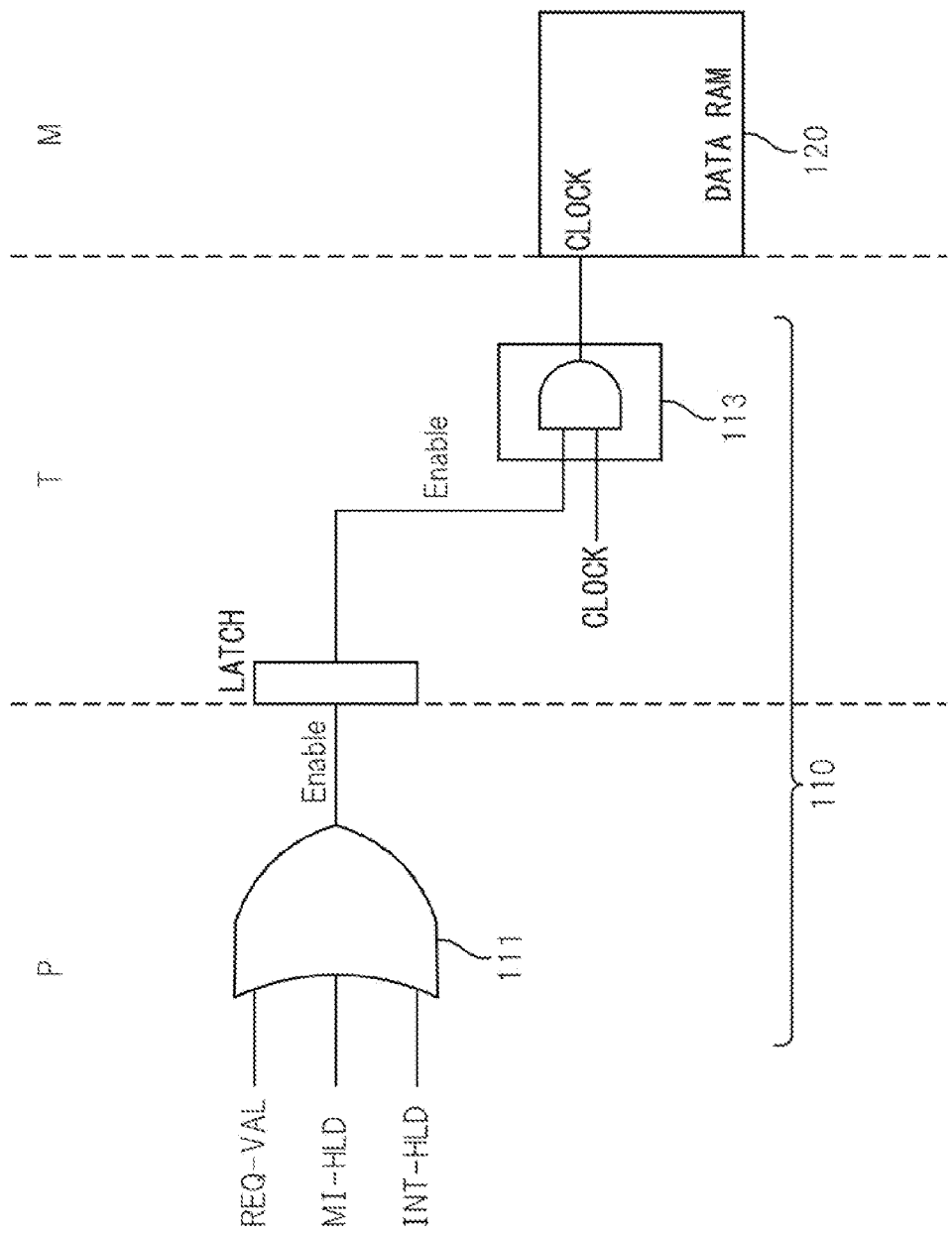
FIG. 14 is an example of flow diagram of a clock control unit.

FIG. 14 is an example of flow diagram of a clock control unit. The clock control unit 110 has an OR circuit 111, a latch circuit 112, and a clock buffer 113.

The OR circuit 111 receives a REQ-VAL (request-valid signal, MI-HLD (move in-hold) signal, and INT-HLD (interrupt-hold) signal and, if any of the signals is "H", supplies an enable signal to the later clock buffer 113 through a latch circuit 112. When any of the signals is "L", the enable signal is not supplied to the clock buffer 113.

The REQ-VAL signal is a signal which becomes "H" when an EXT request is supplied from the instruction execution unit 4. The MI-HLD signal is a signal which becomes "H" when the MI request is in a state in the request input wait state of FIG. 3 (S103). The INT-HLD signal is a signal which becomes "H" when the INT request is in a state in the request input wait state of FIG. 3 (S103).

The clock buffer 113 supplies a clock to the data RAM 120 when the output of the AND circuit based on the input enable signal and the clock becomes "H".

In this way, the clock control unit 110 supplies a clock to the data RAM 120 when any of the REQ-VAL signal, MI-HLD signal, and INT-HLD signal is "H" and does not supply a clock to the data RAM 120 when all of the signals are "L". Accordingly, when the priority circuit 25 is supplied with any of the EXT request, INT request, or MI request, the clock control unit 110 supplies a clock to the data RAM 120, while when it is not supplied with any of the above requests, does not supply a clock to the data RAM 120.

In this way, the clock control unit 110 performs control so as not to supply a clock to the data RAM 120 when data held by the data RAM 120 is not being accessed, so can reduce the power consumption of the data RAM.

FIG. 15 is an example of an error check circuit. As illustrated in FIG. 15, the error check circuit 130 has an ExOR circuit 131, OR circuit 132, and selection circuit 133.

When the data read out once from the data RAM 120 is a J byte, the ExOR 131 uses the parity bit for each byte to check if the parity is an odd parity. The ExOR circuit 131 outputs an "H" data parity error signal when a parity error occurs.

The OR circuit 132 outputs a logical OR of the data parity error for each byte received from a plurality of ExOR circuits 131 as a data error way signal to the selection circuit 133. If even one of the data parity error signals received by the OR circuit 132 is "H", the data error way signal becomes "H".

The selection circuit 133 receives a tag hit way signal specifying the way at which the cache hit occurred and selects the data error way signal specified by the tag hit way signal. When the selected data error way signal is "H", it indicates that there is error in the data read out from the data RAM 120.

Figure 16:
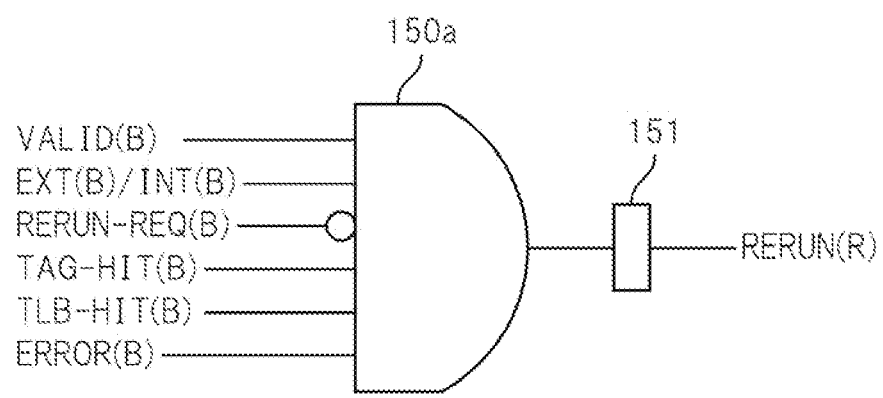
FIG. 16 is an example of rerun request generation unit.

FIG. 16 is an example of a rerun request generation unit. One example of a rerun request generation unit 150 is an AND circuit 150a. The AND circuit 150a receives a VALID, EXT request or INT request, rerun request (RERUN-REQ), tag hit (TAG-HIT), TLB hit (TLB-HIT), and error (ERROR). When the VALID, EXT request or INT request, tag hit, TLB hit, and error are all "H" and the rerun request is "L", the AND circuit 150a outputs an "H" RERUN signal. Note that, the input signals of the AND circuit 150a are all generated at the B stage, while the RERUN signal is output at the stage after the B stage, that is, the R stage, through the latch circuit 151.

In this way, the rerun request generation unit 150 generates a RERUN signal when error occurs and a RERUN-REQ signal is not supplied from the instruction execution unit 4.

Figure 17:
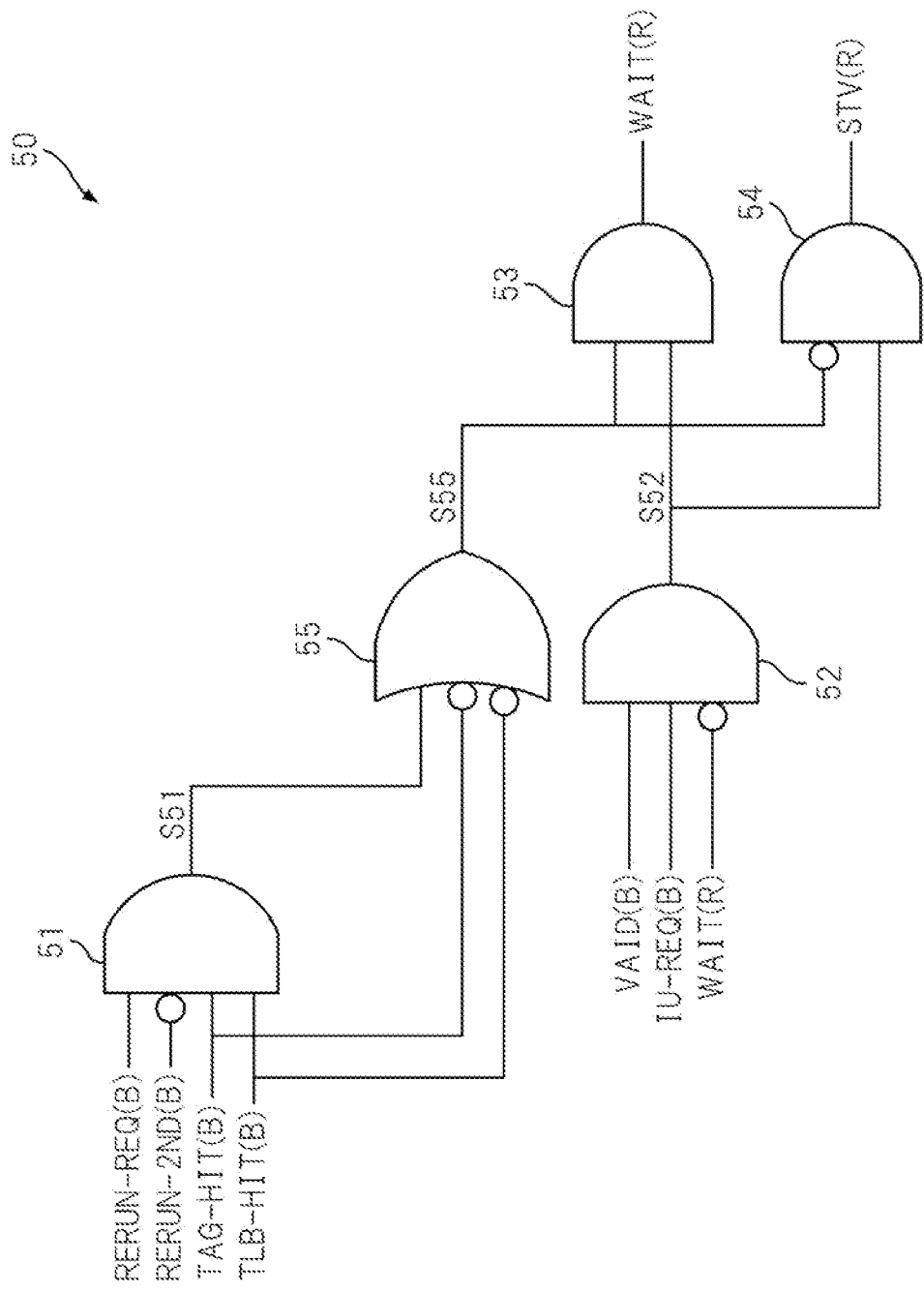
FIG. 17 is an example of control signal generation unit.

FIG. 17 is an example of a control signal generation unit. The control signal generation unit 50 has AND circuits 51, 52, 53, and 54 and an OR circuit 55.

The AND circuit 51 receives a RERUN-REQ signal, RERUN-2nd signal, TAG-HIT signal, and TLB-HIT signal. The AND circuit 51 outputs an "H" signal S51 when the RERUN-REQ signal, TAG-HIT signal, and TLB hit signal are all "H" and the RERUN-2nd signal is "L".

The OR circuit 55 outputs an "H" signal S55 when receiving any of an "H" signal S51, "L" tag hit (TAG-HIT) signal, or "L" TLB-HIT signal.

The AND circuit 52 outputs an "H" signal S52 when receiving an "H" VALID signal, "H" EXT request or INT request, and "L" wait signal.

The AND circuit 53 outputs an "H" wait signal when receiving an "H" signal S55 and an "H" signal S52.

The AND circuit 54 outputs an "H" STV signal when receiving an "L" signal S55 and an "H" signal S52.

In this way, when receiving an "H" RERUN-REQ signal, the control signal generation unit 50 operates to output a wait signal and suppress the output of the STV signal. When receiving an "L" RERUN-REQ signal or "H" RERUN-2nd signal, the control signal generation unit 50 operates to outputs an STV signal, suppress the output of the wait signal, and resume the pipeline operation.

As illustrated in FIG. 8, if a wait signal is supplied to the pipeline 100, an INT signal is output. Further, as illustrated in FIG. 2, the wait signal is input to the pipeline 100.

Figure 18:
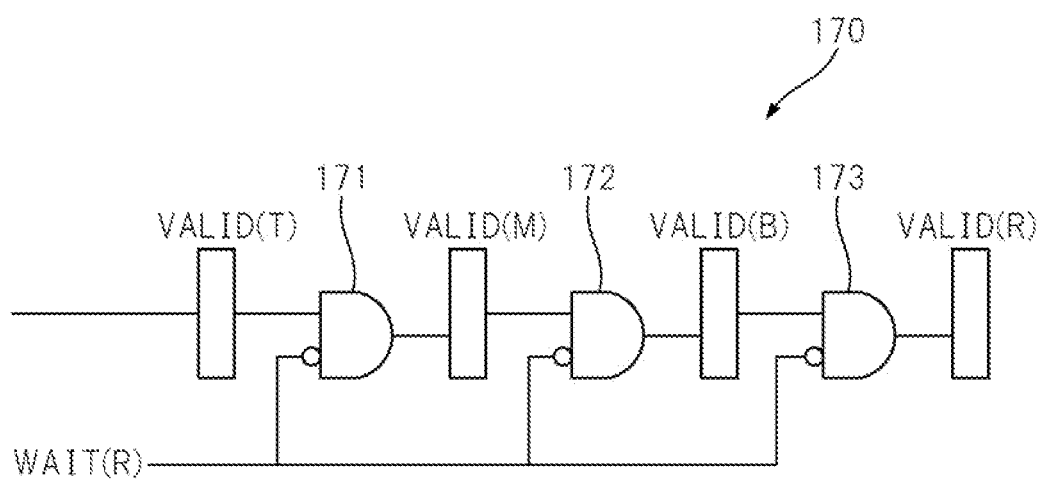
FIG. 18 is an example of block diagram of VALID signal processing of a pipeline.

FIG. 18 is an example of block diagram of VALID signal processing of a pipeline. The pipeline illustrated in FIG. 18 has AND circuits 171, 172, and 173. If an "H" wait signal is supplied to the AND circuits 171, 172, and 173, the outputs of the AND circuits 171, 172, and 173 become "L". Accordingly, when the wait signal is "H", propagation of the VALID signal at the pipeline can be suppressed.

FIG. 19 is an example of layout chart of the circuit configuration of a processor. As illustrated in FIG. 19, the data RAM 120 occupies a large area in the processor 10, so the distance of the interconnects of the region where the data RAM 120 is arranged and the region where the pipeline 100 is arranged inevitably becomes longer. For this reason, by arranging the rerun request generation unit 150 not inside the cache controller 200, but in the vicinity of the data RAM 120 and generating a rerun request in the cycle of the B stage and sending it to the data RAM 120, it is possible to send the rerun request to the data buffer 5 in the cycle of the R stage.

Figure 20:
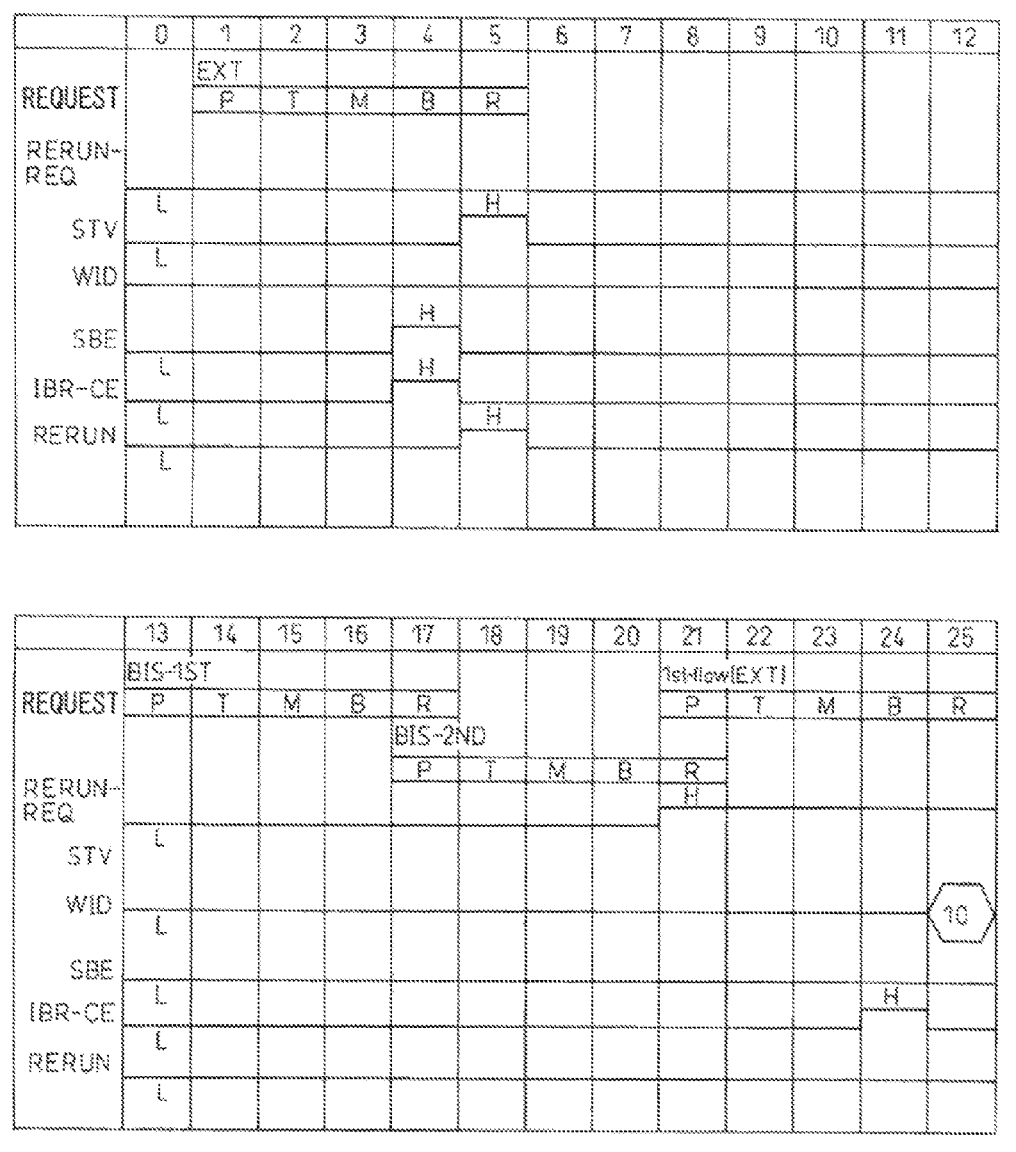

FIG. 20 and FIG. 21 are time charts illustrating one example of pipeline processing when a rerun request is issued. In FIG. 20 and FIG. 21, changes in the signal levels of the RERUN-REQ signal, STV signal, WID signal, SBE signal showing the data RAM error, IBR-CE signal showing writing in the data buffer, and the RERUN signal are illustrated.

At the P stage of the pipeline 100, an EXT request is received.

At the B stage, the SBE signal becomes "H" and the IBR-CE signal also becomes "H". That is, the error data is supplied to the data buffer 5.

As explained using FIG. 17, if the RERUN-REQ signal is "L", the control signal generation unit 50 outputs an "H" STV signal. For this reason, at the R stage, the STV signal becomes "H".

As explained using FIG. 16, due to the error signal in the input signals of the rerun request generation unit 150 becoming "H", at the B stage, the RERUN signal becomes "H". Accordingly, even if the instruction execution unit 4 receives the STV signal, it simultaneously receives the RERUN signal. Due to this, it is possible to discard the STV signal and avoid the inconvenience of the instruction execution unit 4 using data received at the B stage.

If a RERUN signal is supplied, the instruction execution unit 4 instructs reset of the VALID signal of the holding circuits TW, MW, BW, and RW and the pipeline. Due to this, the requests held by the pipeline 100 are eliminated and the pipeline operation is stopped.

At the 13th to 21st cycles, the pipeline 100 receives the BIS request from the L2 cache 400 whereby the line of the L1 cache 20 in which error occurred is invalidated. Note that, at the 13th to 21st cycles, the processing is illustrated as if there were two flows running the pipeline two times. This is so as to check if there is a line requiring invalidation in the tag RAM at the first flow and to invalidate the tag RAM at the second flow.

At the P stage of the 21st cycle in the timing chart of FIG. 21, the instruction execution unit 4 supplies the pipeline with an EXT request. Together with the supply of this EXT request, a RERUN-REQ signal is supplied, so the RERUN-REQ signal becomes "H". As explained in FIG. 8, the RERUN-REQ signal propagates through the flag signal latches at the different stages, so at the 21st to 25th cycles, the RERUN-REQ signal maintains the "H" state.

At the B stage of the 24th cycle of the clock in the timing chart of FIG. 21, the data RAM error (SBE) is "L". Further, the WID signal becomes 10 indicating that the pipeline was interrupted due to the occurrence of a cache miss. This is so that the line involved is invalidated at the second flow.

In the time period of the 30th to 37th cycles of the clock in the timing chart of FIG. 21, the pipeline 100 receives an MI request from the cache controller 200 whereby data loaded from the L2 cache 400 is written into the corresponding line.

At the 40th cycle of the clock in the timing chart of FIG. 21, the pipeline 100 receives the INT request from the cache controller 200 Due to the INT request, as explained in FIG. 8, the flag signal which was held at the flag signal latch is reinput. As explained in FIG. 9, the RERUN-REQ signal is included in the INT request, so propagates through the flag signal latches at the different stages. Accordingly, at the time period of the 21st to 25th cycles of the clock in the timing chart of FIG. 21, the RERUN-REQ signal maintains the "H" state.

At the 43rd cycle of the clock in the timing chart of FIG. 21, the SBE signal is "L". At the 43rd cycle of the clock, the IBR-CE signal transits to "H" and the data loaded from the L2 cache 400 is supplied to the data buffer 5. Accordingly, the preceding flow, that is, the MI-2nd flow, is due to a rerun request. The conditions by which the flow is kept waiting without cache hit and error stand, so at the 44th cycle, the WID signal becomes "71".

In the time period of the 47th to 51st cycles of the clock in the timing chart of FIG. 21, the RERUN-REQ signal is included in the INT request and propagates through the flag signal latches at the different stages. Accordingly, in the time period of the 47th to 51st cycles, the RERUN-REQ signal maintains the "H" state.

Further, as explained in FIG. 9, at the holding circuit RW, "WID=71" is held. For this reason, the input INT request includes "WID=71". By decoding of "WID=71", the RERUN-2nd signal not illustrated in FIG. 21 becomes "H".

When the RERUN-2nd signal becomes "H", at the R stage of the 51st cycle of the clock in the timing chart of FIG. 21, as explained in FIG. 17, the wait signal becomes "L" and the STV signal becomes "H". Accordingly, the pipeline 100 is resumed and the instruction execution unit 4 can use the data held in the data buffer 5.

At the P stage of the 47th cycle of the clock of the timing chart of FIG. 21, if receiving an "H" RERUN-REQ signal, the control signal generation unit 50 outputs an STV signal, whereby the instruction execution unit 4 can use the data received at the B stage at the 43rd cycle of the clock in the timing chart of FIG. 21.

In this way, if avoiding error by loading data from the L2 cache, by generating an STV signal at the 51st cycle of the clock of the timing chart of FIG. 21, the instruction execution unit 4 can use the data received at the 43rd cycle of the clock at the timing chart of FIG. 21. In the above way, by supplying the STV signal and RERUN signal to the instruction execution unit 4, even without having error detection of the error check circuit 130 as an input signal, the L1 cache 20 can maintain the function of the STV signal.

FIG. 22 is an example of time chart illustrating pipeline processing when a rerun request is issued. At the time period of the 0th to 38th cycles in the timing chart of FIG. 22, while not illustrated in FIG. 22, the operation explained with reference to FIG. 20 and FIG. 21 is explained again.

At the B stage of the 50th cycle of the clock in the timing chart of FIG. 22, the SBE signal is "H", but the IBR-CE signal is "L", so data is not written into the data buffer 5. This is because normal data was already being sent to the instruction extraction unit 4 at the 43rd cycle. In this way, after data was normally sent to the instruction execution unit 4, even if error occurs in a certain line, since the normal data has already been sent, the processing can be continued without invalidation due to the BIS request or loading of data from the L2 cache 400 due to the MI request.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A processor comprising:
a secondary cache memory configured to store data;
an instruction execution unit including a primary cache memory configured to store data read out from the secondary cache memory based on a load request and is configured to execute processes based on the data stored in the primary cache memory, wherein the primary cache memory includes:

a data memory configured to store data read out from the secondary cache memory based on the load request;

a tag memory configured to store address information for checking cache hit/miss of the data read out from the data memory;

an error detection unit configured to detect an occurrence of error in data read out from the data memory;

a rerun request generation unit configured to generate a rerun request when the error detection unit detects the occurrence of error in the data read out from the data memory by the load request, wherein the rerun request causes a reissuing of the load request for the data in which the error is detected; and a permission information generation unit configured to output to the instruction execution unit, a usage permission information for the data stored in the secondary cache memory by checking cache hit/miss of the data read out from the data memory based on the address information stored in the tag memory, wherein the generation of the rerun request by the rerun request generation unit and the output of the usage permission information by the permission information generation unit are executed at the same cycle in which the error detection unit detects the occurrence of the error, and wherein the instruction execution unit is configured to retransmit a load request to the primary cache memory when receiving the rerun request.

2. The processor according to claim 1, wherein:

the processor further has a clock control unit configured to supply a clock to the data memory when a load request for the primary cache memory is given; and the data memory outputs data when the clock is supplied.

3. A control method of a processor having a secondary cache memory, and an instruction execution unit including a primary cache memory configured to store data read out from the secondary cache memory based on a load request and is configured to execute processes based on the data stored in the primary cache memory, the primary cache memory including a data memory configured to store data read out from the secondary cache memory based on the load request and a tag memory configured to store address information for checking cache hit/miss of the data read out from the data memory, the control method comprising:

reading out data from the secondary cache memory to the data memory based on the load request;

detecting an occurrence of error in data read out from the data memory;

generating a rerun request when the occurrence of error in the data read out from the data memory by the load request is detected at the detecting, wherein the rerun request causes a reissuing of the load request for the data in which the error is detected;

outputting, to the instruction execution unit, a usage permission information for the data stored in the secondary cache memory by checking cache hit/miss of the data read out from the data memory based on the address information stored in the tag memory; and retransmitting a load request to the primary cache memory when receiving the rerun request, wherein the generation of the rerun request at the generating and the output of the usage permission information at the outputting are executed at the same cycle in which the occurrence of the error is detected at the detecting.

4. The control method of a processor according to claim 3, wherein:

a clock is supplied to the data memory when a load request to the primary cache memory is given; and data is output from the data memory when the clock is supplied.

* * * * *